UNITED STATES PATENT OFFICE.

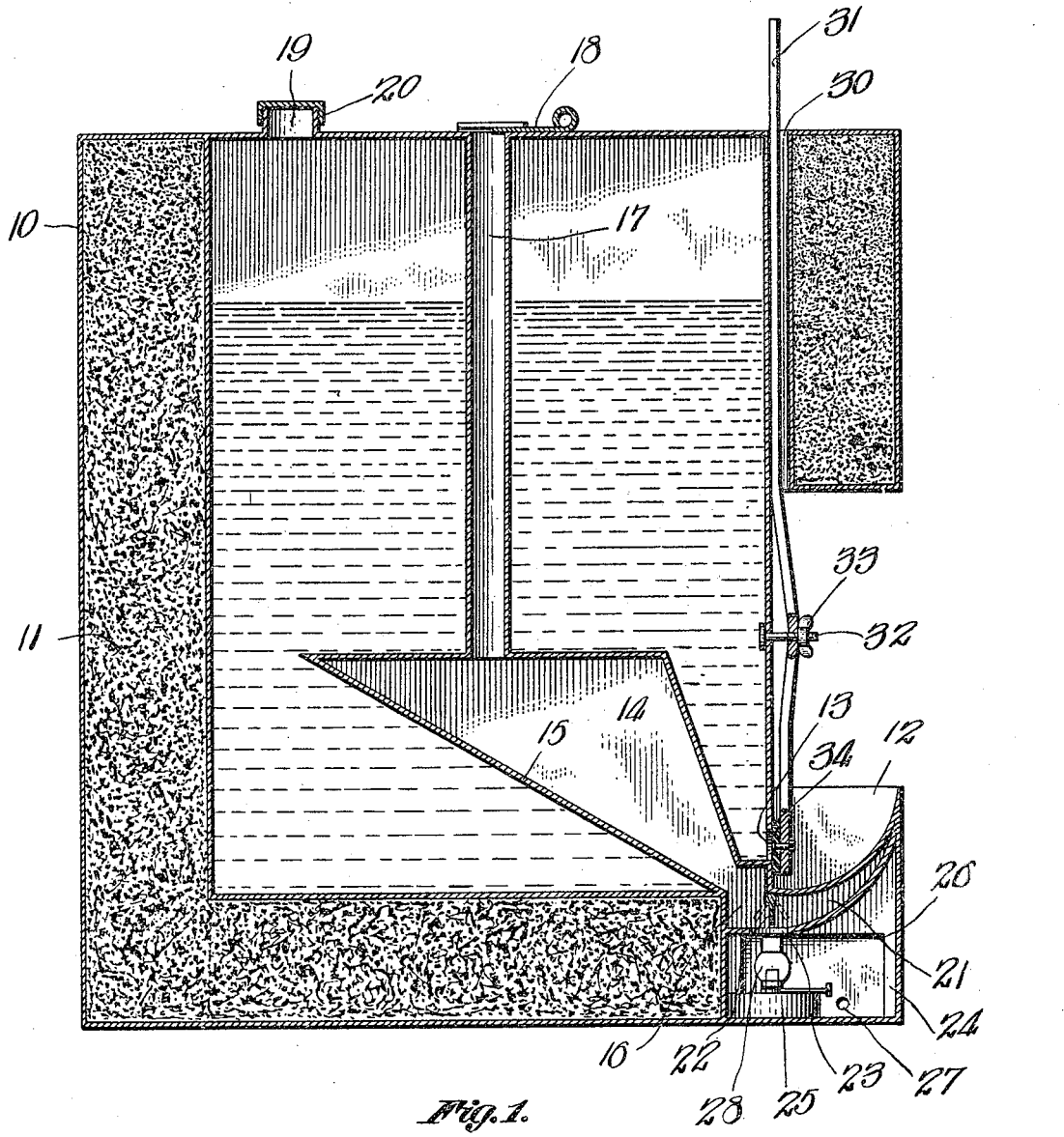

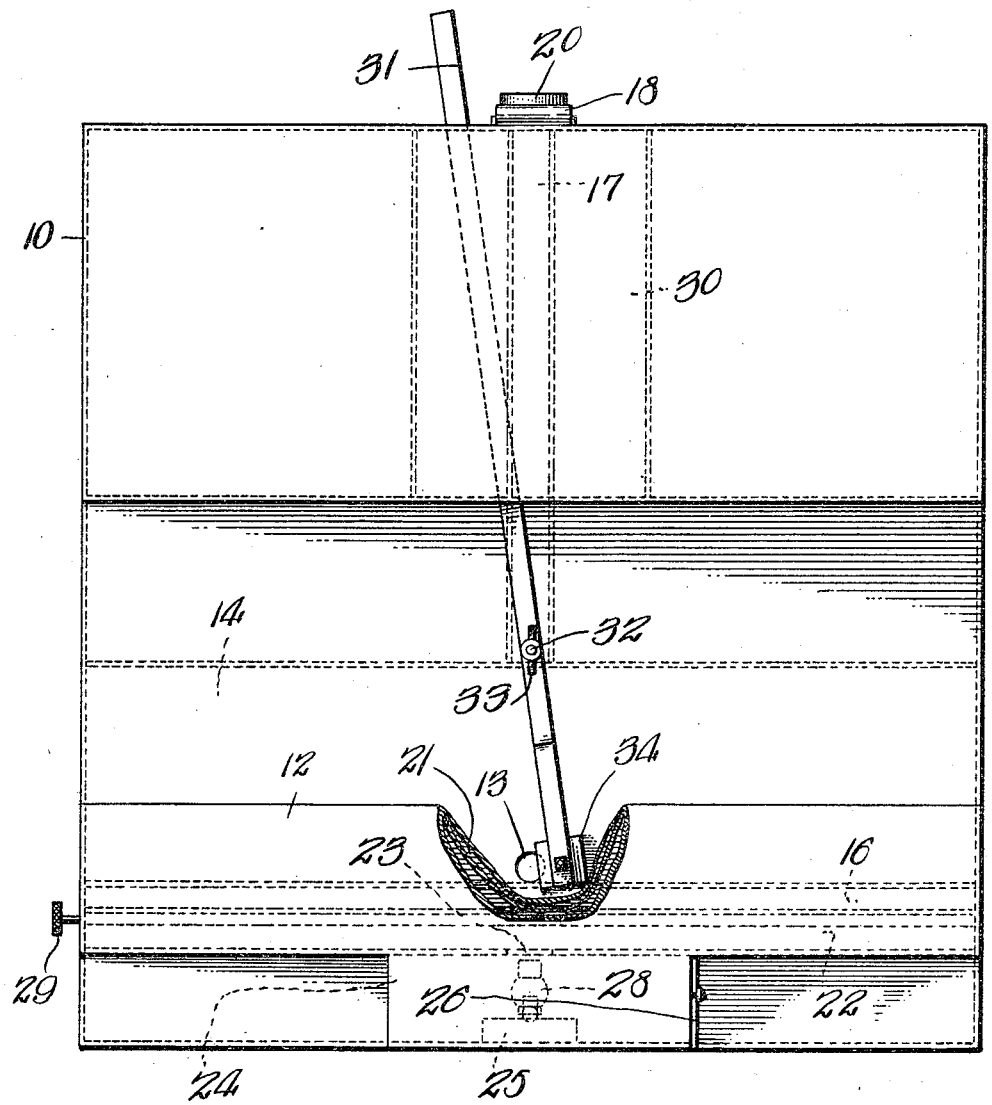

CHARLES W. BLACKBURN, OF ROCK FALLS, ILLINOIS.

WATERING-TANK HEATER.

950,066.  Specification of Letters Patent.  Patented Feb. 22, 1910.

Application filed March 18, 1909. Serial No. 484,106.

*To all whom it may concern:*

Be it known that I, CHARLES W. BLACKBURN, a citizen of the United States, residing at Rock Falls, in the county of Whiteside, State of Illinois, have invented certain new and useful Improvements in Watering-Tank Heaters; and I do hereby declare the following to be a full, clear, and exact description of the invention, such as will enable others skilled in the art to which it appertains to make and use the same.

This invention relates to watering tanks, more particularly to devices of this character employed for watering stock, and has for one of its objects to improve the construction and increase the efficiency and utility of devices of this character.

Another object of the invention is to provide a device of this character wherein provision is made for heating the water in the tank and likewise heating the water in the trough by one heating medium and controlling the supply of heat.

With these and other objects in view, the invention consists in certain novel features of construction as hereafter shown and described and then specifically pointed out in the claims, and in the drawings illustrative of the preferred embodiment of the invention, Figure 1 is a transverse vertical section of the improved device. Fig. 2 is a front elevation with a portion of the watering trough broken away to disclose the controlling valve between the tank and the trough.

The improved device comprises a tank represented generally at 10, of any suitable size and preferably surrounded with a protecting packing 11 of saw dust or similar material to protect the water in the tank from cold in winter or external heat in summer. The tank may be of any required size or from any suitable material, and it is not desired therefore to limit the invention to the size or construction of the tank, but the tank will preferably be of galvanized iron or steel, and for the purpose of illustration a tank of sheet metal is shown.

Attached to the tank at one side is a watering trough 12, connected to the tank by an aperture 13. Arranged within the tank is a hot air chamber 14, preferably with an inclined bottom 15 leading into a short vertical flue 16, the latter depending below the floor or bottom of the tank as shown. Extending from the chamber 14 is a vertical flue 17, the latter leading through the top of the tank and supplied with a controlling valve 18. The tank is also provided with an intake or supply tube 19 provided with a screw closure cap 20.

Extending from the lower terminal of the short vertical flue 16 is a hot air chamber 21 extending beneath the water trough 12.

Mounted for oscillation at the juncture of the flues 16 and chamber 21 is a damper 22, and formed in the bottom of the flue 16 and chamber 21 is an aperture 23, the damper 22 being arranged directly above this aperture.

Arranged beneath the trough 12 and its chamber 21 and likewise extending beneath the flue 16, is a chamber or receptacle 24 having a lamp 25 or other heating medium. The receptacle 24 is provided with a hinged closure 26 and likewise provided with suitable air supply apertures 27. The lamp is so located that its chimney 28 comes directly beneath the aperture 23 and is spaced slightly below the same, so that the heat rising from the chimney will pass into the flue 16 and thence to the chamber 14 and also into the chamber 21. By this arrangement it will be obvious that the heated air passes simultaneously to the chambers 14—21, and by adjusting the damper 22 the proportion of heat which is supplied to the chambers may be readily controlled. For instance if the damper be set toward the chamber 21 the major portion of the heat will pass to the chamber 14, and if the damper be set to the left or toward the flue 16 the major portion of the heat will pass to the chamber 21, and if the damper be set in a vertical position the heat will be divided equally between the two chambers. By this means the degree of heat supplied to the chambers is easily controlled.

The damper 23 is provided with a controlling disk 29 as shown in Fig. 2.

Formed between the body of the tank 10 and the packing space at the front is a vertical passage 30 through which a lever 31 extends, the lever being pivotally united to the tank by a threaded bolt 32 having a wing nut 33, whereby the lever is mounted to swing upon the bolt and its tension controlled by the wing nut, the lever as shown, being curved outwardly so that pressure applied by the wing nut will be effective upon the lever. Attached to the inner face of the lever at its lower end is a valve 34, preferably of rubber or like material, and adapted to bear over the aperture 13 and close the connection between the tank and the trough. By this simple means the outlet 13 may be closed when the tank is to be replenished, to prevent the water flowing therefrom during the time that the cap 20 is removed. The water is prevented from flowing too freely by the external air pressure operating against the reduced pressure within the tank, in the usual manner of device of this character.

By this simple means the temperature of the water in the tank and in the trough may be readily controlled, and adapted to the condition of the weather. Thus in very cold weather when the water in the trough is liable to freeze quickly, the heat supplied to the chamber 21 may be increased by adjusting the damper as before described, and in less severe weather the supply of heated air may be divided between the two chambers, or the heat turned entirely into the chamber 14 if required. The valve 18 enables the flow of heated air to be controlled and the temperature increased or decreased as required.

The improved device is simple in construction, can be readily applied to any size or form of tank without material structural changes in the parts.

What is claimed, is:—

1. In a device of the class described a tank, a watering trough arranged to receive water from the tank, a hot air chamber within the tank, a hot air chamber beneath said trough, a flue connecting said chambers, an outlet flue leading from said tank chamber, and a heating medium connected to said connecting flue, and a valve within said connecting flue and operating to control the heat imparted to said connecting flue and chamber.

2. A device of the class described comprising a tank, a watering trough arranged to receive water from the tank, a hot air chamber beneath said trough, a hot air supply flue connected to the chamber which is located beneath said trough, a hot air chamber within the tank and connected to said hot air supply flue, said tank chamber having its sides diverging from said supply flue, an outlet flue leading from said tank chamber, a heating medium arranged to supply heated air to said supply flue, and a controlling valve located in said connecting flue.

In testimony whereof, I affix my signature, in presence of two witnesses.

CHARLES W. BLACKBURN.

Witnesses:
S. J. COLWELL,
WM. M. GRUMNER.